(12) United States Patent
Ryan

(10) Patent No.: US 10,455,752 B2
(45) Date of Patent: Oct. 29, 2019

(54) AGRICULTURAL WHEEL

(71) Applicant: RFM AG PTY LTD, Coolamon, NSW (AU)

(72) Inventor: Paul Edward Ryan, Horsham (AU)

(73) Assignee: RFM AG Pty Ltd, Coolamon, New South Wales (AU)

( * ) Notice: Subject to any disclaimer, the term of this patent is extended or adjusted under 35 U.S.C. 154(b) by 357 days.

(21) Appl. No.: 14/764,594

(22) PCT Filed: Jan. 30, 2014

(86) PCT No.: PCT/AU2014/000057
§ 371 (c)(1),
(2) Date: Jul. 30, 2015

(87) PCT Pub. No.: WO2014/117215
PCT Pub. Date: Aug. 7, 2014

(65) Prior Publication Data
US 2015/0366123 A1   Dec. 24, 2015

(30) Foreign Application Priority Data

Jan. 31, 2013   (AU) ................................ 2013900309

(51) Int. Cl.
*A01B 29/04* (2006.01)
*A01B 23/00* (2006.01)
*A01B 29/00* (2006.01)

(52) U.S. Cl.
CPC ............ *A01B 29/046* (2013.01); *A01B 23/00* (2013.01); *A01B 29/00* (2013.01); *A01B 29/04* (2013.01)

(58) Field of Classification Search
CPC ........... A01C 5/00; A01C 5/068; A01B 25/00; A01B 35/28; A01B 21/00
See application file for complete search history.

(56) References Cited

U.S. PATENT DOCUMENTS

| | | | | |
|---|---|---|---|---|
| 375,364 A | * | 12/1887 | Dow ...................... | A01B 9/003 172/532 |
| 433,573 A | * | 8/1890 | Dow ...................... | A01B 9/003 172/532 |
| 1,191,404 A | * | 7/1916 | Cummer ................ | A01B 9/003 172/532 |
| 1,218,930 A | * | 3/1917 | Cummer ................ | A01B 9/003 172/185 |

(Continued)

FOREIGN PATENT DOCUMENTS

| | | |
|---|---|---|
| FR | 2868244 A1 | 10/2005 |
| WO | 1988/002981 A1 | 5/1988 |
| WO | 2001/076351 A1 | 10/2001 |

OTHER PUBLICATIONS

International Search Report for PCT/AU2014/00057 dated Feb. 27, 2014 (3 pages).

*Primary Examiner* — Jessica H Lutz
(74) *Attorney, Agent, or Firm* — Michael Best & Friedrich LLP

(57) ABSTRACT

A ground driven agricultural wheel for use as a press wheel or press harrow comprising a helical coil having a first end, a second end and windings therebetween, the coil having spring characteristics to allow sufficient flexure and relative movement between the windings, wherein the first and second ends are mounted to a hub assembly.

20 Claims, 11 Drawing Sheets

(56) References Cited

U.S. PATENT DOCUMENTS

| | | | | |
|---|---|---|---|---|
| 1,788,165 A | * | 1/1931 | Lienhart | A01B 39/18 |
| | | | | 172/532 |
| 1,878,142 A | * | 9/1932 | Hjermstad | A01B 35/16 |
| | | | | 172/532 |
| 2,503,317 A | * | 4/1950 | Bergquist | A01B 29/046 |
| | | | | 172/532 |
| 2,747,490 A | * | 5/1956 | Brown | A01B 1/06 |
| | | | | 172/349 |
| 2,808,771 A | | 10/1957 | Brown | |

* cited by examiner

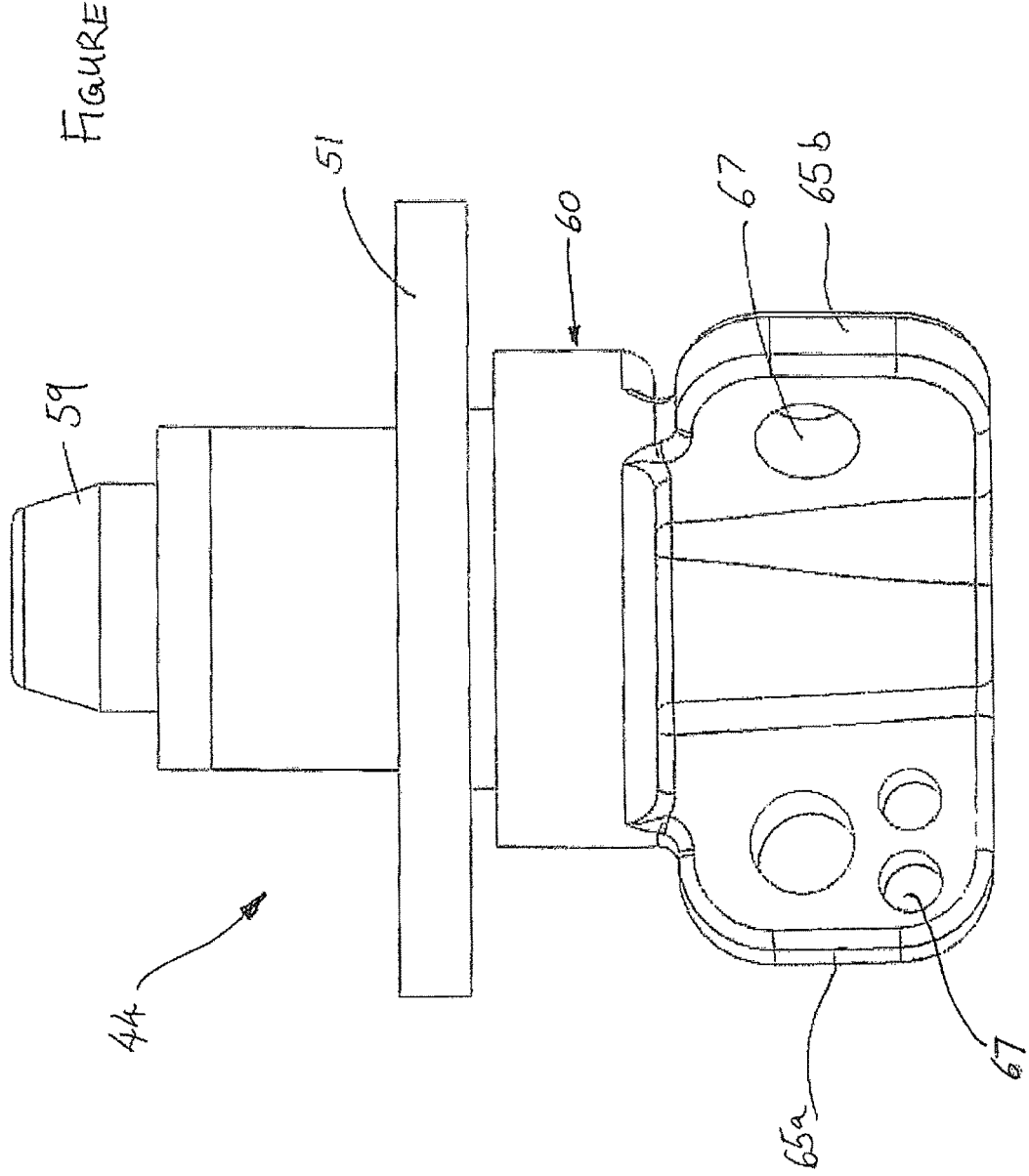

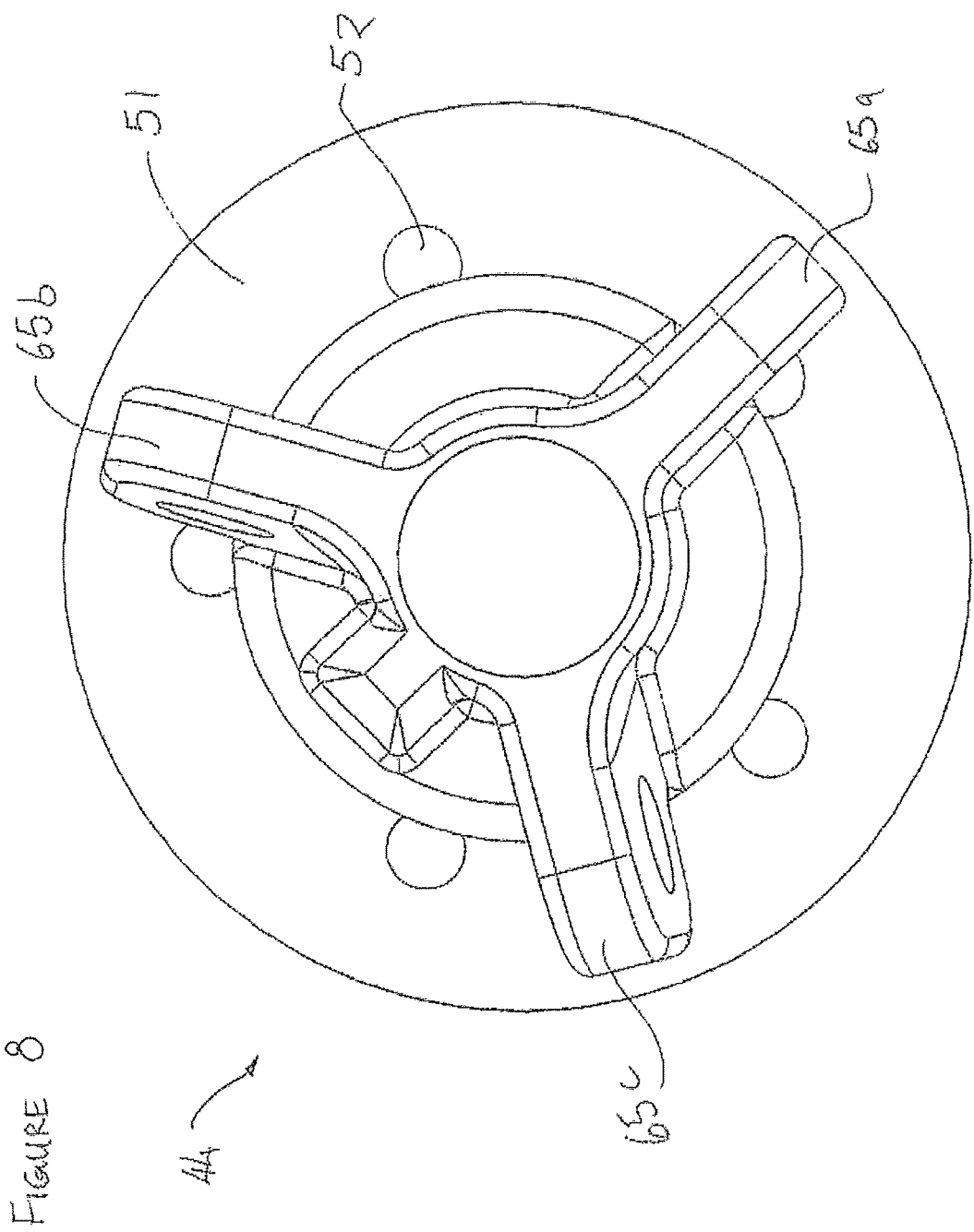

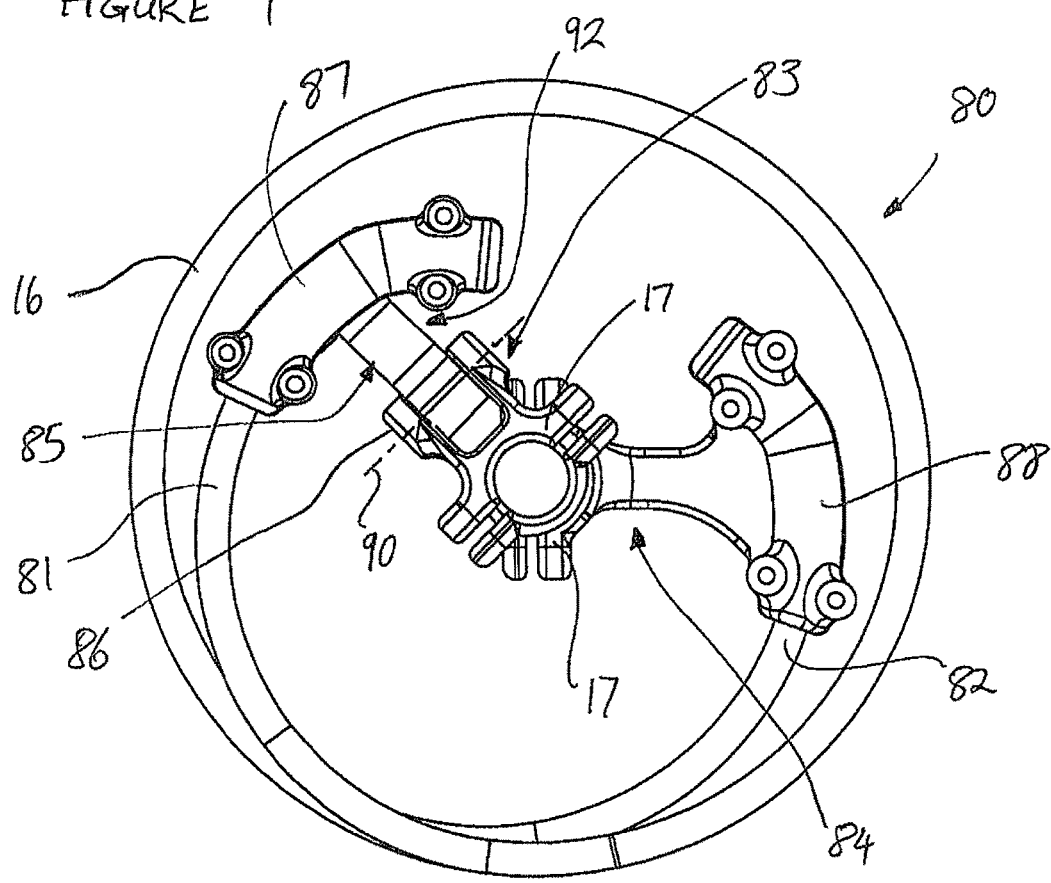
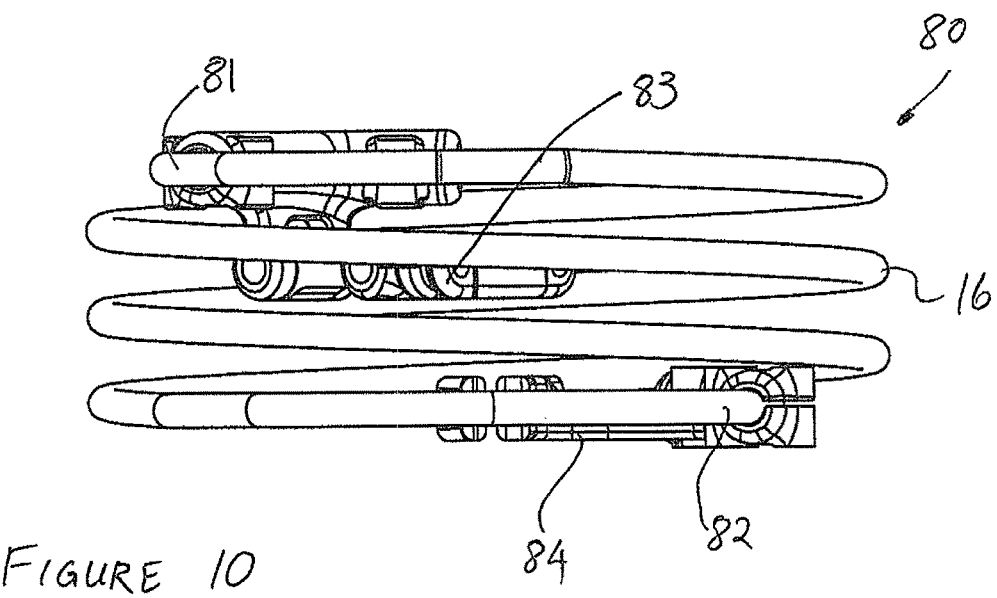

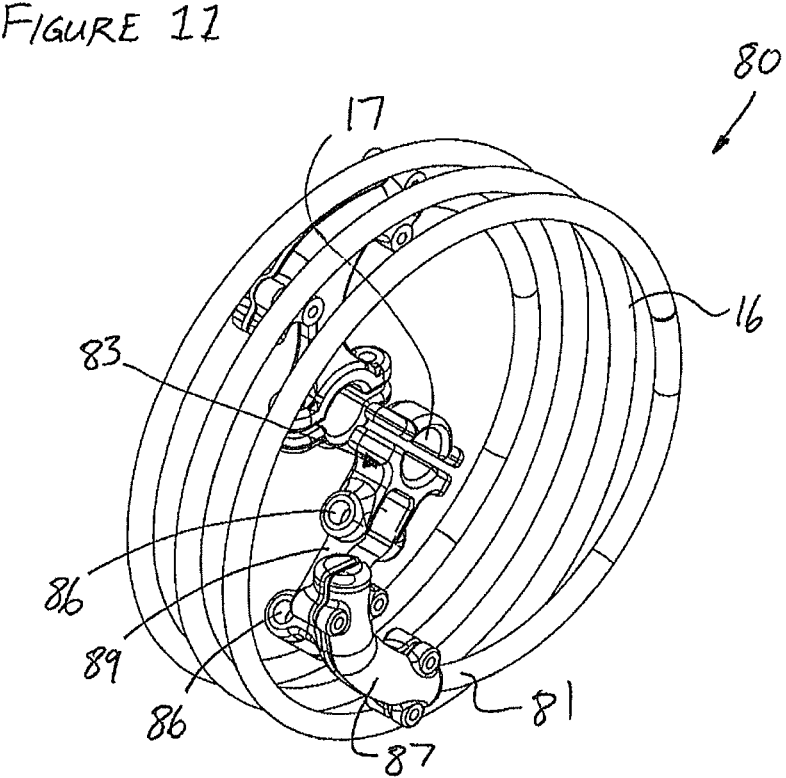
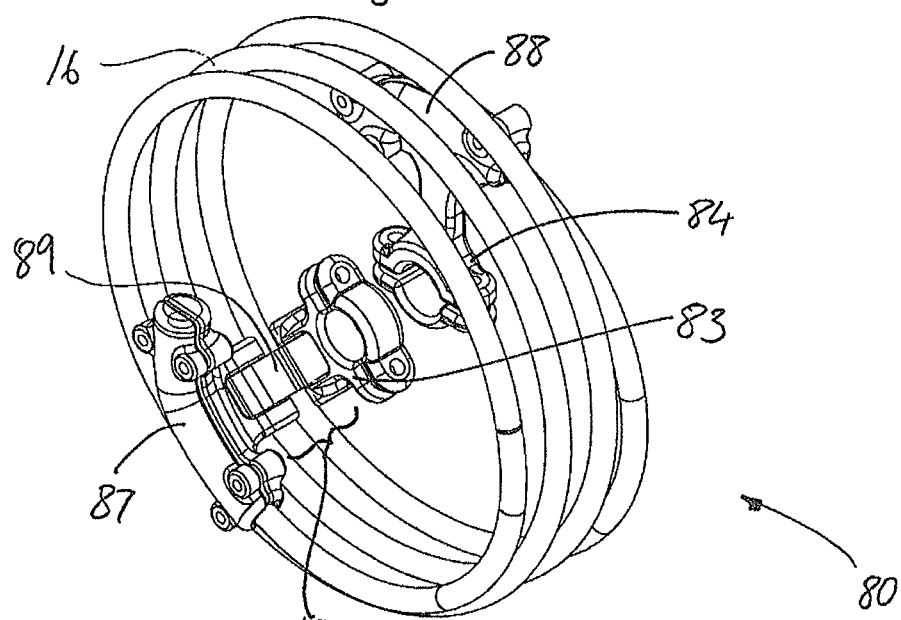

AGRICULTURAL WHEEL

This invention relates to a ground driven agricultural wheel for use as a press wheel or a press harrow in agriculture and specifically for use in cultivating land.

BACKGROUND OF THE INVENTION

Traditional methods of ploughing a field before seeding involve the use of a cultivator machine to turn over the entire top layer of soil. In order to prevent soil erosion and to obtain higher crop yields, there should be minimal soil disturbances during both the ploughing operation and the seeding operation.

Several tillage devices have been designed with this object in mind. In particular, press wheels mounted one behind each tyne on tillage and seeding devices are intended to close over furrows containing seeds with minimal disturbance and press firmly down onto the soil compacting the grain underneath as soil to grain contact is important for a good crop yield. Grains sown in crumbly and cloddy soil will be slower to germinate until the next rain, by which time the grain may have turned mouldy and has to be re-sown. For this reason the use of press wheels has become popular for compacting grain under soil ensuring grain to soil contact.

Known press wheels comprise a solid flat metal or rubber wheel. In certain conditions these can become clogged with mud and trash and consequently, instead of pressing the furrow downwardly to cover the seeds, the press wheel gouges into the soil and more mud and trash collects about the press wheel leaving clods of soil and exposed seeds. Deep furrows also result which contributes to water erosion in fields at a detriment to crops.

The present invention is directed to providing an improved agricultural wheel that overcomes and addresses the known problems associated with agricultural wheels.

SUMMARY OF THE INVENTION

In accordance with the invention there is provided a ground driven agricultural wheel for use as a press wheel or press harrow comprising a helical coil having a first end, a second end and windings therebetween, the coil having spring characteristics to allow sufficient flexure and relative movement between the windings, wherein the first and second ends are mounted to a hub assembly.

In one embodiment the first end is mounted to the hub assembly via a link. The link permits relative movement between the first end and the hub assembly so that the distance between the hub assembly and first end is variable. The link may comprise a hinge. In one embodiment there are two hinges to create a double hinge arrangement and permit relative movement at the link whereby the distance between the first hub assembly and first end is variable, ie. can move closer together or further apart. The hinges can have parallel axes of rotation.

In this embodiment or a further embodiment, the first and second ends are mounted to separate hub assemblies. The first end is mounted to a first hub assembly via a link, which comprises a hinge, or via two links or hinges. As above, the links or hinges permit relative movement between the first hub assembly and the first end.

In this embodiment the first end corresponds to a leading coil and the second end corresponds to a trailing coil. The second end is fixedly mounted to a second hub assembly.

In another aspect the present invention provides a ground driven agricultural wheel for use as a press wheel or press harrow comprising a helical coil having a first end, a second end and windings therebetween, the coil having spring characteristics to allow sufficient flexure and relative movement between the windings, the first end being mounted to a hub assembly wherein the hub assembly is mounted to a shaft or stub axle via a torsion dampening mechanism.

In this embodiment the torsion dampening mechanism includes a resilient torsion dampener between two connecting parts in the hub assembly that directly or indirectly connect the coil windings to the shaft or stub axle. The torsion dampening mechanism acts to dampen rotational forces experienced in the hub assembly relative to the shaft or stub axle as the agricultural wheel is driven along the ground.

In an embodiment the hub assembly includes a shaft attachment adapted to be mounted to a shaft or stub axle. The hub assembly can also comprise a keyed rod extending from a coil mount where the keyed rod inserts into a torsion dampener that is housed in the shaft attachment. The keyed rod is parallel to an axis of rotation of the shaft or stub axle.

In one embodiment the torsion dampener is a rubber insert contained in a corresponding recess in the shaft attachment. The torsion dampener and recess are preferably shaped to resist rotation of the dampener with respect to the shaft attachment and in one preferred embodiment the torsion dampener and recess are square in cross section.

The shaft attachment may include a clamping mechanism through which a shaft can extend and be securely clamped therein. The shaft may support one or more press harrow wheels.

In an alternative embodiment the shaft attachment includes an attachment mechanism for attaching to a stub axle assembly and to allow rotation of a stub axle relative to the shaft attachment. A bearing may be carried on the stub axle assembly to provide for rotation. The stub axle assembly can be mounted on a suspension arm and in one embodiment the stub axle assembly is mountable on a suspension arms at various angles.

In a further embodiment a coil dampener is located between the first end and the hub assembly in a coil mount. In this embodiment, the first end is clamped between coil mount plates in the hub assembly and the dampener is located between the plates.

The coil dampener in the further embodiment is preferably an insert located in a rebate in the hub assembly and has an aperture through which the first end locates.

The coil dampener or the torsional dampener are made of a shock absorbing material such as nylon, polyurethane or rubber. The coil dampener is angular and anchors into the rebate by locating grooves of the insert into corresponding protrusions on an inside of the hub assembly.

BRIEF DESCRIPTION OF THE DRAWINGS

Embodiments of the invention will now be described by way of example only, with reference to the accompanying drawings in which:

FIG. 7 is a side view of the stub axle assembly;

FIG. 8 is an end view of the stub axle assembly;

FIG. 9 is a front view of a coil wheel in accordance with a third embodiment;

FIG. 10 is a top view of the coil wheel of FIG. 9;

FIG. 11 is a first isometric view of the coil wheel of FIG. 9;

FIG. 12 is a second isometric view of the coil wheel of FIG. 9; and

DETAILED DESCRIPTION OF PREFERRED EMBODIMENTS OF INVENTION

Figure 1:
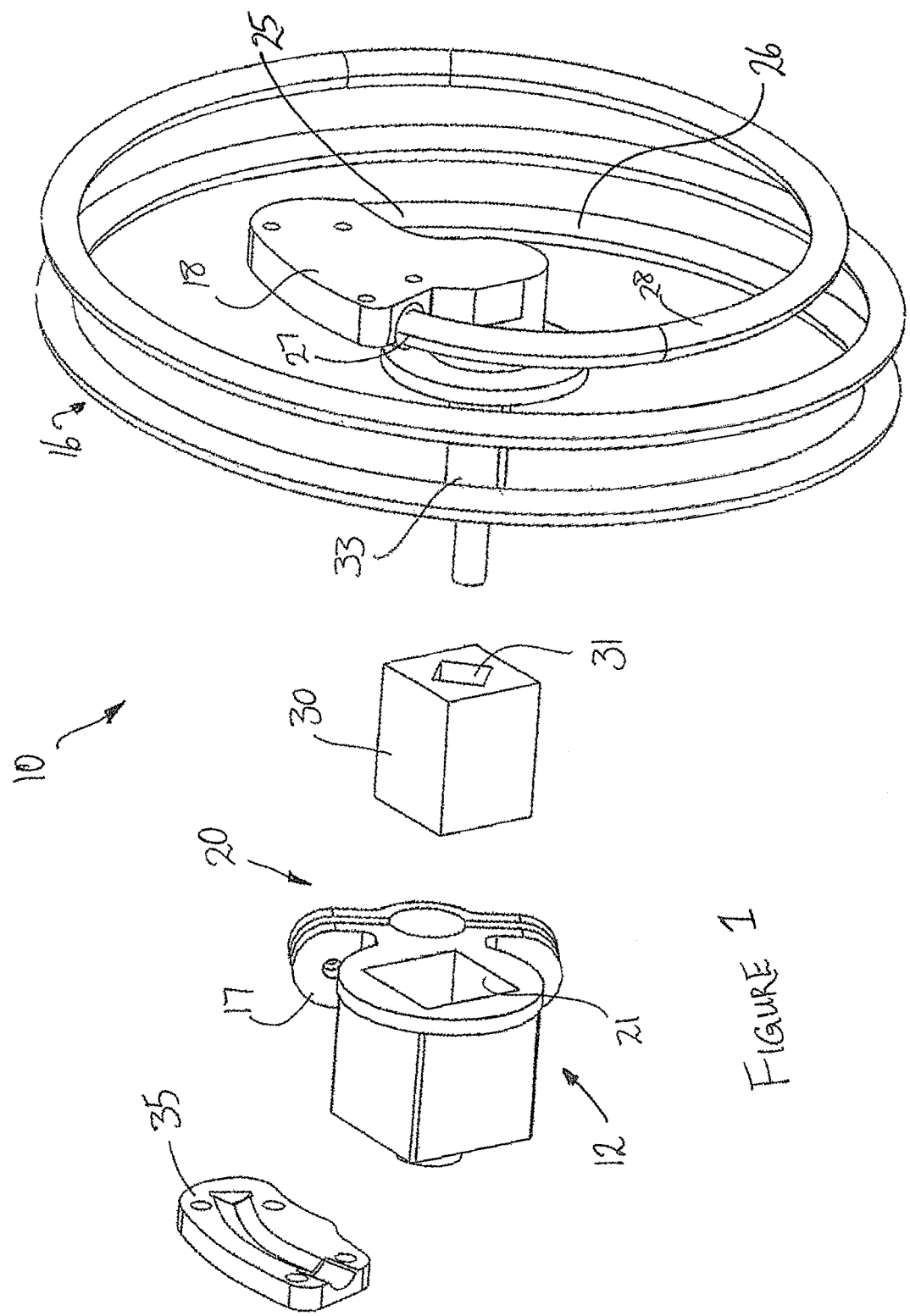
FIG. 1 is an exploded isometric view of an agricultural wheel used as a press harrow in a first embodiment.

An agricultural wheel 10 as illustrated in the Figures, also referred to herein as a cultivating wheel, provides an effective means of cultivating soil with minimal breakages during the cultivating operation. The agricultural wheel 10 is ground driven and can be used to perform various agricultural tasks including being used as a press harrow or a press wheel. FIG. 1 illustrates a first embodiment of the agricultural wheel as a press harrow, and FIGS. 2 to 8 illustrate a second embodiment of the agricultural wheel as a press wheel, while FIGS. 9 to 13 illustrate a third embodiment of the agricultural wheel that is suitable as both a press harrow or press wheel, and where both ends of the coil are secured.

As a press harrow, or levelling harrow, the agricultural wheel is typically mounted on a shaft, usually at an angle to the direction of travel so as to not bite the ground as deeply as when used as a press wheel, and dragged by a tractor behind a cultivator/tilling implement over the ground covering a wider area and thereby levelling the soil. The dragging motion of the press harrows occurs simultaneously with rotation of the shaft on which the harrows are mounted. Often gangs of press harrows are mounted in line on a shaft and assemblies of shaft mounted harrows may be arranged one behind the other to position the harrows in staggered formation.

When used as a press wheel the agricultural wheel travels behind a share mounted on a tyne of a cultivator machine. The wheel rotates on a shaft or stub axle in line with the direction of travel of the cultivator, that is, rotation is about an axis perpendicular to the direction of travel. In this manner the cultivating wheel closes and presses down on the furrow formed by the cultivator share. The press wheel may be angled relative to the direction of travel to cover a wider area as may be required by wider furrows.

Generally, the agricultural wheel comprises a helical coil having spring characteristics to allow sufficient flexure and relative movement between the windings that allows it to be used as both a press wheel or a press harrow. One or both ends of the helical coil is mounted to a hub assembly and the hub assembly is mounted to a shaft or stub axle. The shaft or stub axle as described above can be mounted through any suitable arrangement to a larger structure for attaching to a farm vehicle.

While the helical coil provides some dampening against vibrations and ground obstacles, in the embodiments of FIGS. 1 to 8, a torsion dampening mechanism between the hub assembly and stub axle or shaft provides added dampening.

The torsion dampening mechanism can take various forms, of which one main form is described herein in relation to one embodiment of the agricultural wheel, but generally the torsion dampening mechanism includes a torsion dampener between two connecting parts in the hub assembly where those connecting parts directly or indirectly connect the coil windings to the shaft or stub axle. The torsion dampening mechanism acts to dampen rotational forces experienced in the hub assembly relative to the shaft or stub axle as the agricultural wheel is driven along the ground in order to minimise stress and breakages on the coil windings.

As shown in FIG. 1, the press harrow 10 comprises a helical coil 16 secured to a hub assembly 12 that is attached to the shaft 14. The helical coil 16 is substantially a continuous, cylindrical helical spring having a free end 25 at a free terminal winding 26 and a fixed end 27 at a fixed terminal winding 28 which is secured to the hub assembly 12 at a coil mount 18.

Hub assembly 12 includes a shaft attachment 20 having a clamp 17 through which shaft 14 extends. Shaft 14 is clamped to the hub assembly through clamp 17 using fasteners (not shown) extending through fastening apertures 19 to clamp the hub assembly onto the shaft. The clamp 17 is positioned along a central axis of the helical coil 16 so that the shaft extending through clamp 17 lies along the central axis.

In bringing the fixed terminal winding 28 towards the hub assembly and inwardly of a circumference of the coil 16, the radius of the terminal winding at the fixed end is smaller than the general radius of the helical coil to create a tighter curve in the terminal winding.

Shaft attachment 20 also includes a recess 21 designed to house a torsion dampener 30. Torsion dampener 30 is resilient and contains a through hole 31 for receiving a keyed rod 33 extending from coil mount 18 in the hub assembly. Keyed rod 33 inserts into hole 31 and extends parallel to an axis of the shaft or stub axle. The keyed rod is designed to remain in a substantially fixed relationship with the torsion dampener, except for a degree of rotational movement allowed by the resilience in the torsion dampener, and the torsion dampener is designed to remain in a substantially fixed relationship relative to the shaft attachment 20, again except for limited movement as allowed through the resilient nature in the torsion dampener.

In one form, the torsion dampener 30 is a rectangular block made of a resilient material and more preferably a shock absorbing material comprising any material known for having shock/vibration absorbing characteristics. Examples of suitable materials include nylon, polyurethane, agricultural rubber, woven rubber insertion, using a centralising spring or a gel filled pouch.

As discussed above the rectangular block form of the torsion dampener 30 is designed to remain in a fixed relationship relative to recess 21 of shaft attachment and thereby resist rotational movement within the recess. Similarly, the hole 31 is shaped to be square in cross section in order to resist rotational movement of keyed rod 33, which is correspondingly shaped square in cross section. The square cross section of hole 31 in torsion dampener 30 is 45° out of phase to the square cross section of the block-shaped dampener. This is to maximise the strength of the torsion dampener in resisting rotational forces from the keyed rod 33.

Accordingly, the hub assembly maintains the relationship between the helical coil and shaft, in this case a fixed relationship, yet is capable of reducing the transfer of forces between the coil and shaft by dampening the forces.

The torsion dampener dampens rotational forces between two connecting and cooperating parts in the hub assembly, namely in this embodiment the keyed rod 33 and the shaft attachment 20, which connecting parts are either directly or indirectly attached to the coil windings and shaft/stub axle and thereby the connection between the helical coil and shaft/stub axle is dampened against forces, mainly rotational forces but also uni-directional forces that may come about for example through jolts and jarring of the agricultural wheel against uneven ground.

Figure 5:
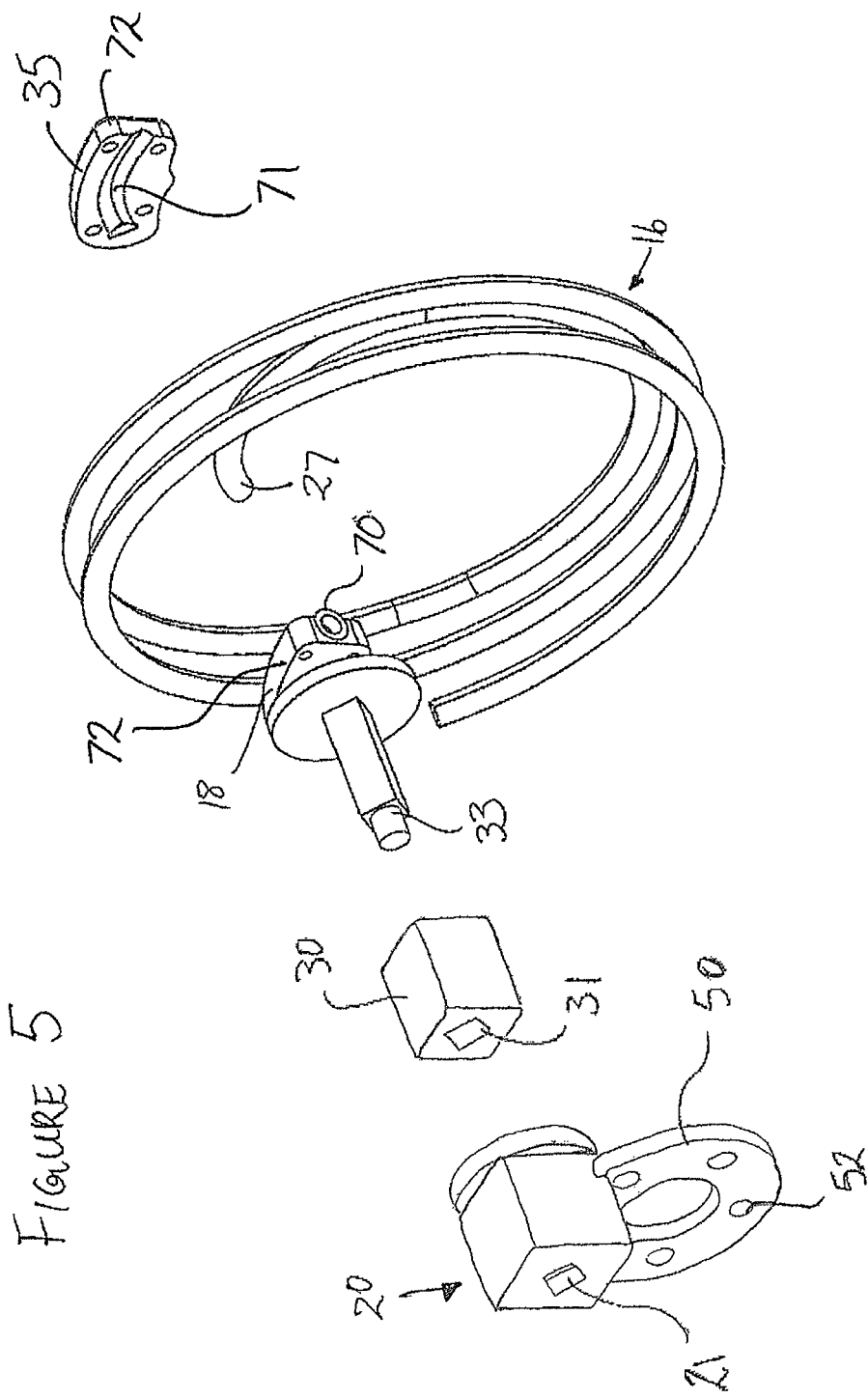
FIG. 5 is an exploded isometric view of the press wheel.

As illustrated in FIG. 1, coil mount 18 receives fixed end 27 of the fixed terminal winding 28. Mount 18 includes a plate cap 35 that is secured by screws or other fasteners to hold fixed end 27 of the helical coil within coil mount 18. A coil dampener 70, as illustrated in FIG. 5 in relation to the press wheel embodiment and discussed in more detail further below, is located within coil mount 18, and in this embodiment is an O-ring surrounding the fixed end 27 of the coil to provide additional, and optional, dampening against vibration forces between fixed end 27 and the hub assembly 12. Coil dampener 70 smooths the travel of press wheel 10 over the rocky terrain of agricultural fields. This in turn provides for a more constant downward pressure on the ground and consistency in compacting seeds.

It is understood that the provision of coil dampener 70 is optional to the first and second embodiments of the agricultural wheel and that the wheel can rely on the advantages of the torsion dampening mechanism alone to dampen travelling forces and protect the wheel from damage.

In the first and second embodiments the free terminal winding 26 at the free end 25 of the helical coil 16 is not secured and is free to move, but it is understood that free end 25 may also be secured, as described hereunder in relation to the third embodiment. Coil 16 is axially flexible or spring-like such that the free terminal winding 26 is capable of moving axially relative to the terminal winding 22 at the fixed end 27.

FIGS. 2 to 8 illustrate a press wheel 40 as a second embodiment of the agricultural wheel. The parts in the press wheel 40 that are the same as the corresponding parts in the press harrow 10, are given the same reference numbers below. Press wheel 40 is similar to the press harrow 10 in that it also includes a helical coil 16 mounted to a hub assembly 42, but differs from the press harrow in the way the press wheel 40 is mounted to a frame 46 attached to a vehicle (not shown). Press wheel 40 is mounted to a stub axle 44 and is designed to rotate over the ground to produce a different effect to the dragging effect of the press harrow.

Specifically, as the press wheel 40 rotates over ground, portions of the windings reciprocally move together then separate. Particularly with use in furrows, as corresponding portions of the windings come into contact with the ground the portions move closer together narrowing the gaps between the windings and substantially simulating a single solid press wheel when in contact with the ground. The coming together of the windings evenly compacts the soil in the seeded furrows. Upon leaving contact with the ground the windings separate thus flicking any mud build up off the coil and rotate around once again. The winding portions therefore constantly move relative to one another thereby dislodging any mud build up on the wheel.

Press wheel 40 also has a torsion dampening mechanism located between the hub assembly and the stub axle in order to dampen forces experienced by the coil thereby protecting the coil itself and reducing the forces transferred to the stub axle. The torsion dampening mechanism, similar to the press harrow 10, is a torsion dampener 30 located in a recess 21 of the shaft attachment 20.

Figure 2:
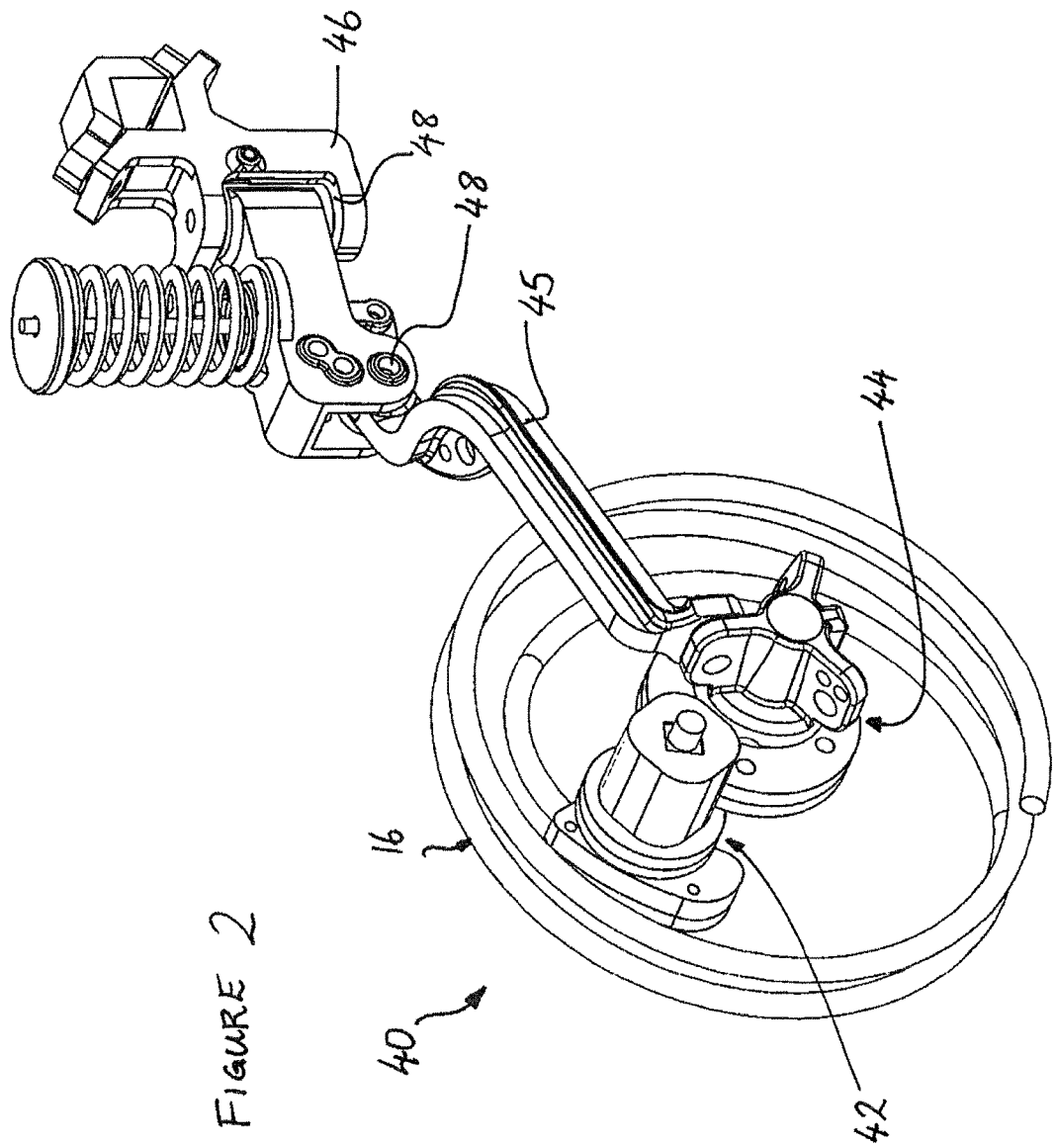
FIG. 2 is an isometric view of an agricultural wheel used as a press wheel mounted on a support arm in a second embodiment.

FIG. 2 illustrates the press wheel 40 mounted to a stub axle assembly 44 that is in turn mounted to a suspension arm 45. Suspension arm 45 is pivotally mounted to the frame 46 and a frame suspension coil provides extra suspension to the suspension arm 45. The position of the suspension arm 45 carrying press wheel 40 can be adjusted relative to the vehicle by pivoting the arm in at least two planes at pivot joints 48.

Figure 3:
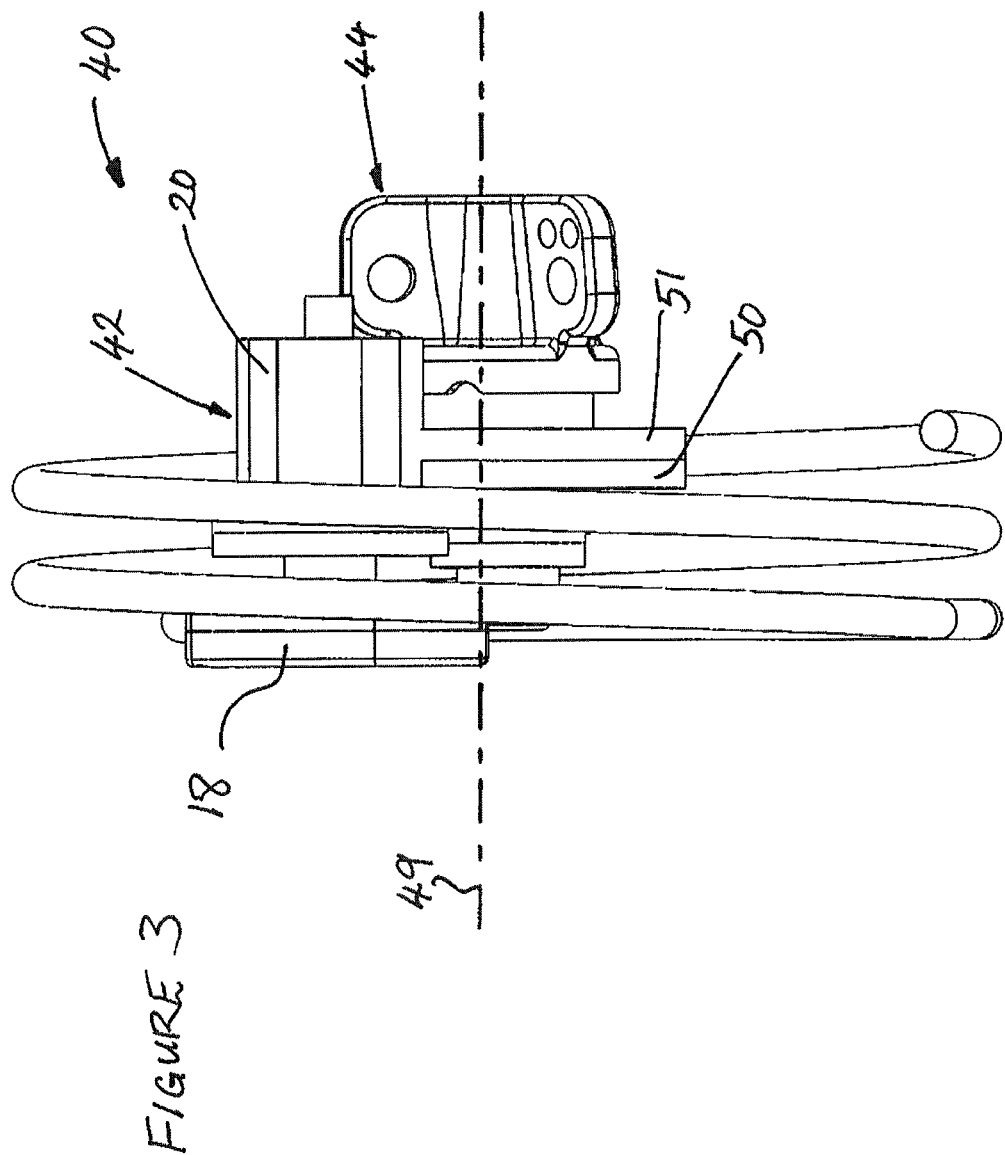
FIG. 3 is a side view of the press wheel of FIG. 2.

FIG. 3 is a side view of the press wheel 40 mounted to stub axle assembly 44. Stub axle assembly 44 is aligned so that its central axis of rotation 49 lies centrally through the helical coil so that the agricultural wheel can act as a wheel. Hub assembly 42 is located within the circumference of the helical coil and is offset to the axis 49. Hub assembly 42 is secured to stub axle assembly 44 through corresponding flanges that are fastened together using screw fasteners or the like.

Figure 4:
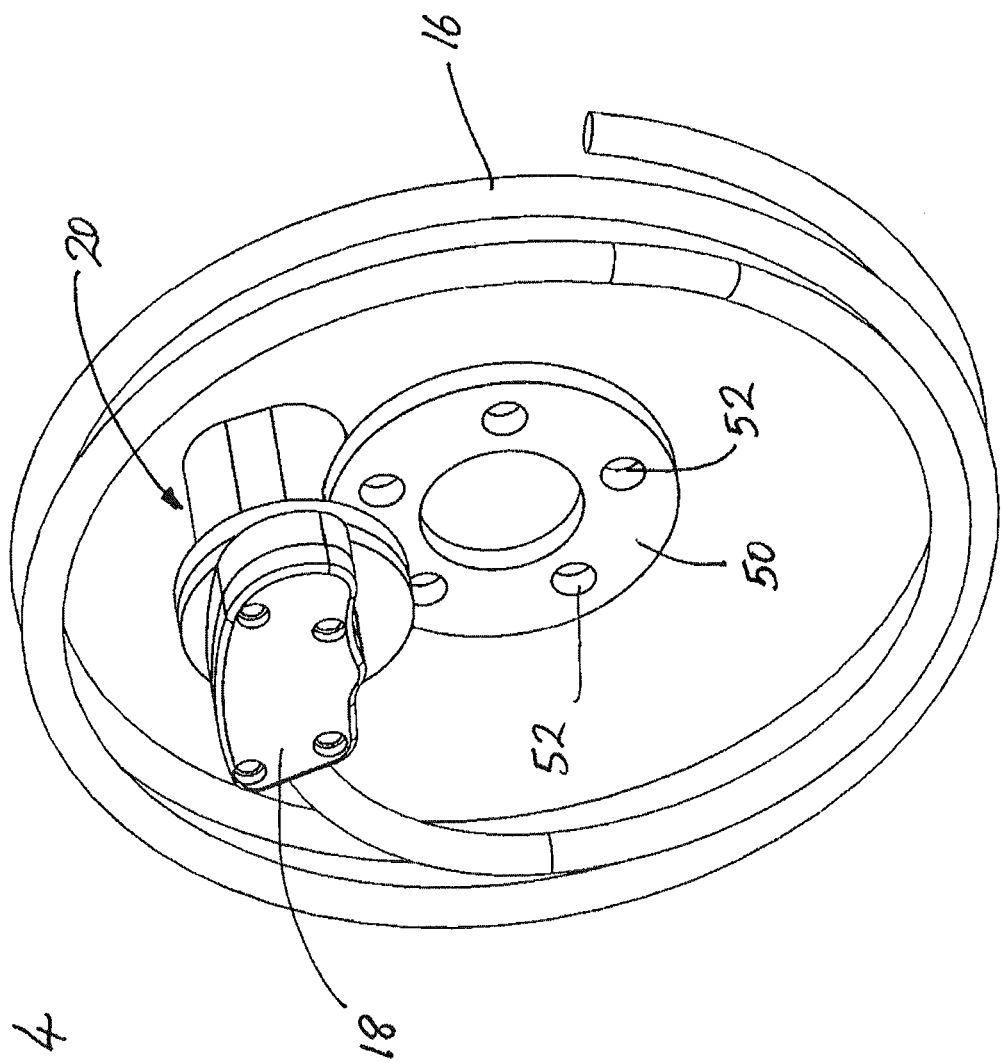
FIG. 4 is another isometric view of the press wheel of FIG. 2.

Also with reference to FIGS. 4 and 5, which illustrate the press wheel 40 only and without attachment to the stub axle assembly 44, an attachment ring 50 is formed offset to the shaft attachment 20. Attachment ring 50 is adapted to mount coaxially to stub axle assembly 44 and to fasten to a correspondingly ring-shaped flange 51 of the stub axle assembly 44 by locating screw fasteners through corresponding screw apertures 52 in attachment ring 50 and flange 51.

The hub assembly in the second embodiment of the agricultural wheel is similar to that described above for the press harrow in that it also comprises a keyed rod 33 extending from coil mount 18 and insertable into a hole 31 of torsion dampener 30, where torsion dampener 30 is an insert housed in a recess 21 of shaft attachment. The difference with the press wheel is the attachment mechanism for attaching the hub assembly to a stub axle (or stub axle assembly) which is a different mechanism for clamping the hub assembly to a shaft, as with the press harrow.

In this embodiment torsion dampener 30 is also square sectioned and block shaped and the central hole 31 is also square in cross section, where the squares of the dampener and hole cross sections are rotated, or out of phase, by 45°.

Figure 6:
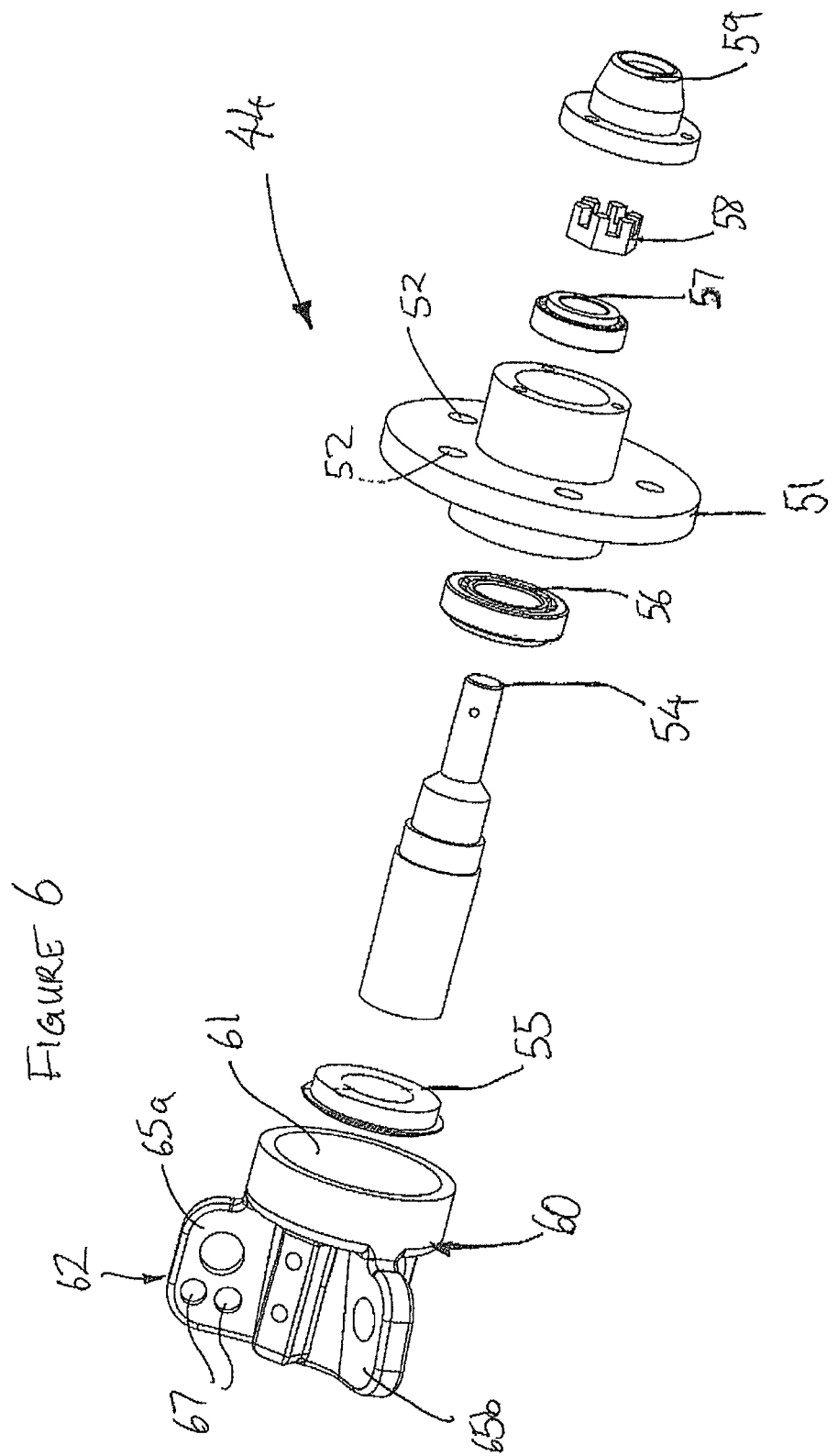
FIG. 6 is an exploded isometric view of a stub axle assembly adapted to be mounted with a press wheel.
Figure 13:
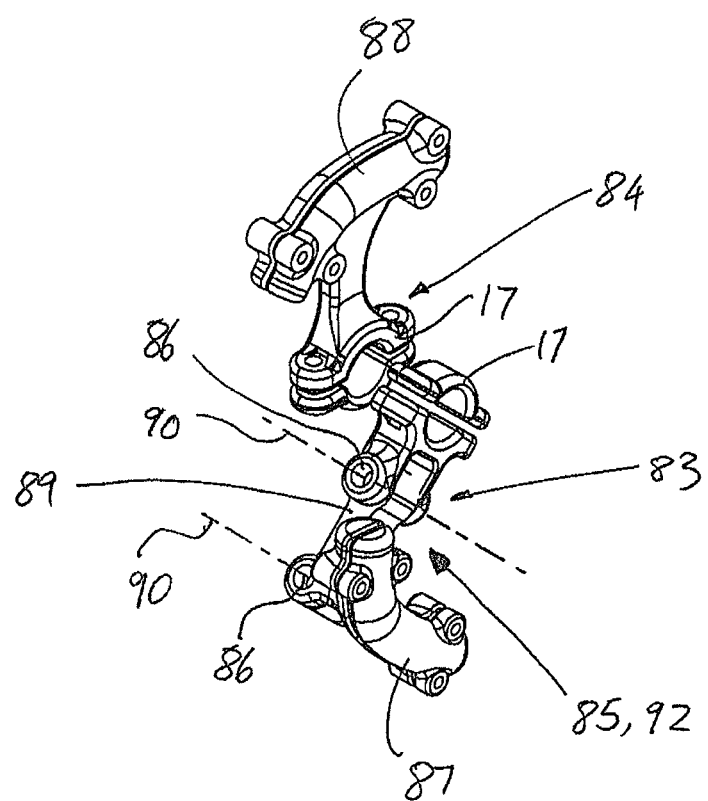
FIG. 13 is an isometric view of the clamp mounts and hub assemblies of the coil wheel of FIG. 9 and does not illustrate the helical coil.

FIGS. 6, 7 and 8 illustrate the stub axle assembly 44 only. In the exploded view of FIG. 6 it can be seen that the stub axle assembly 44 comprises a stub bracket 60 inside of which is mounted an axle 54 sealed at its end by seal 55. A bearing hub 53, which supports ringed flange 51, houses first roller bearing 56 and second roller bearing 57 and axle 54 extends through the bearings and bearing hub 53. The stub axle assembly 44 is fastened together with nut 58 and a dust cap 59 protects the parts of the assembly prone to ingress of dirt and dust.

Stub bracket 60 includes a recessed opening 61 for receiving the axle 54, seal 55 and part of the bearing hub 53, and also includes an attachment end 62 for attaching the stub axle assembly 44, and the press wheel 40 attached to it, to the suspension arm 45 illustrated in FIG. 2. Attachment end 62 comprises three options for mounting the stub axle assembly onto the suspension arm at three different angles. Specifically, three attachment flanges 65a, 65b and 65c extend radially from the central axis 49 and carry attachment apertures 67 for attaching the stub axle assembly to the suspension arm by way of bolts, or other suitable means.

As best illustrated in FIG. 8, flanges 65a, 65b and 65b extend radially at different angles of inclination relative to central axis 49. First attachment flange 65a is inclined at 0°, and is thus in line, and straight, relative to central axis 49. Second attachment flange 65*b* is inclined by 5° relative to the central axis 49 while third attachment flange 65*c* is inclined at 8°.

These three different settings of attachment to the suspension arm allow the press wheel to be mounted at different angles relative to the direction of travel of the vehicle. In effect, this creates a travelling footprint on the press wheel that can be as narrow as the width of the coil windings (set at 0°) where the press wheel rotates squarely along the ground, or as wide as the introduction of an element of drag in the rolling movement of a press wheel mounted at an angle to the direction of travel. This allows the press wheel to press different widths of soil, such as furrows of varying widths and assists in closing the furrow particularly in wet conditions. Angling the press wheel also promotes better self-cleaning of the helical coil.

It is understood that while the angles of 0°, 5° and 8°, have been described here, other angles of inclination are suitable including any angle between 0° and 40°.

The torsion dampening mechanism reduces the probability of damage to the helical coil and in particular to the terminal winding 28 which has a smaller radius than the other windings in the coil and therefore more likely to be the first point to damage or break as a result of vibrational stresses encountered in using the press wheel.

A further dampening mechanism in the form of coil dampener 70, introduced earlier, further reduces the shock absorbing nature of the engagement of the hub assembly 12, 42 and coil 16 to alleviate the stresses at tight bend 28 and thereby avoid damage or breakage to this area of the coil. Coil dampener 70 is illustrated in FIG. 5 as a resilient O-ring that is seated around the fixed end 27 of coil 16 whereby the coil dampener 70 and fixed end 27 are located in a rebate 71 of mounting plates 72 of coil mount 18. The mounting plates securely clamp the fixed end and coil dampener in coil mount 18.

To reduce the amount of bend in tight bend 28, and specifically to prevent the tight bend from exceeding the bend radius of the material, mounting plate 18 can be somewhat elongated and to extend outward from central hub 19 and meet with fixed end 27 closer towards the circumference of the agricultural wheels 10, 40.

FIGS. 9 to 13 illustrate a third embodiment of an agricultural wheel that is a coil wheel 80 that is suitable for use as both a press harrow or a press wheel. The parts in the coil wheel 80 that are the same as the corresponding parts in the press harrow 10 and/or press wheel 40, are given the same reference numbers.

Coil wheel 80 is similar to the press harrow 10 and press wheel 40 in that it also includes a helical coil 16 (although with four windings in the third embodiment) that is mounted at a first end 81 (which is preferably the leading end of the wheel as it rotates) to a first hub assembly 83. Coil wheel 80 differs from press harrow 10 and press wheel 40 in that the second end 82 (preferably the trailing end) is not free to move but is also mounted to a hub assembly, and namely a second hub assembly 84. Furthermore, coil wheel 80 does not necessarily include any dampening mechanism between the coils and shaft/stub axle. Although the dampening mechanism described in the previous embodiments could be provided if desired, it is not necessary to the operation of coil wheel 80.

By securing both the first and second ends of coil wheel 80 greater control over the relative movement of the coil windings is achieved and fatigue and stress on the coil 16 is mitigated. This is particularly useful in stony conditions or when turning corners where forces acting on the agricultural wheel can cause a free terminal winding to overlap with the adjacent winding, which increases the stresses experienced by the agricultural wheel.

In the third embodiment illustrated in FIGS. 9 to 13 the first hub assembly 83 is mounted to the first end 81 by way of a link 85. Link 85 permits at least one degree of movement to allow the first end 81 to move relative to the first hub assembly 83, which is fixed to a shaft or a stub axle through attachment clamp 17. The relative movement through link 85 permits the distance or spacing between the first hub assembly and first end to be variable. Namely, the first hub assembly 83 and first end 81 can move closer together or further apart. This in turn transfers to variable movement between the coil windings and specifically between the first coil winding and the last coil winding.

The last coil winding in the third embodiment illustrated corresponds to the second end 82 of the helical coil 16 and is clamped within a coil mount 88 that is fixed to and forms part of the second hub assembly 84 for mounting onto a shaft or stub axle through another attachment clamp 17. There is no relative movement between the second hub assembly 84 and second end 82 in this embodiment, although it is foreseeable that a link could also be provided at the second end 82.

Link 85 includes at least one hinge that permits movement between first coil end 81 and the first hub assembly 83, and specifically includes two hinges 86 that act as a double hinge arrangement 92 to permit a greater degree of movement between the first end 81 and first hub assembly 83. One of the hinges 86 is located at the first hub assembly 83 while the other of the hinges 86 is located at a first clamp mount 87 into which the first end 81 of the coil is mounted through clamping two halves of the clamp mount together. A linking member 89 links hinges 86 forming a bar linkage. Hinges 86 are pivoting hinges that each rotate about a pivot axis 90 and the pivot axes of the hinges are oriented parallel to each other.

With the first end 81 of the coil wheel 80 being permitted to move relative to the shaft or stub axle by way of the double hinge arrangement 92, the second end 82 of the coil wheel 80 is secured without movement. Accordingly, the coil windings of coil wheel 80 are able to move in response to the coil wheel's movement over ground and to specifically compress closer together in order to deliver a pressing action or a levelling action on the soil and then expand to clear the coil windings of build up of mud and trash. This third embodiment is not only effective in its performance as a press wheel or press harrow, but is also less prone to fatigue and stress on the coil windings because both ends of the coil are restrained, even though the first end is permitted a certain amount of movement. The link that allows movement of the first end permits the coil at that end to expand and compress without twisting the coil, which can also be detrimental to the performance and life of a coil wheel.

In the example illustrated in FIGS. 9 to 13 the first end is representative of the end of the leading coil that leads the rotational travel of the coil wheel 80 as it rotates over a surface. It follows that the second end 82 is representative of the trailing end of the rotating coil. It is however understood that the articulated connection between a hub assembly and coil end could be provided at the trailing end rather than at the leading end.

Two separate hub assemblies 83, 84 are illustrated, although a single, longer hub assembly could instead be used to mount the coil wheel onto a shaft or stub axle whereby opposite ends of the single hub assembly would be connected to each of the first and second ends 81, 82 of the helical coil 16.

The double hinge arrangement 92 includes any type of pivot hinge that would allow relative pivoting movement between the link 85 and the clamp mount 87 and first hub assembly 83. The hinges are cast metal hinges that are pivoted and attached to the clamp mount 87 or hub assembly 83 by a bolt and nut.

The helical coil 16 is preferably made of spring steel thereby providing the wheel with the flexibility required for relative movement of the windings. In one embodiment the maximum outer diameter of the main windings 28 of the coil 16 may be greater than the outer diameter of the hub 12, 83, 84. The diameter of the windings decreases such that the outer diameter of the windings that are mounted to the hub 12, 83, 84 is less than the outer diameter of the plate 18 or clamp mounts 87, 88.

The helical coil 16 has at least two, three or four main windings 28 of equal outer diameter. When pressing furrows these main windings 28 apply a force to the soil to close over the furrow in the soil made during the seeding operation and to also press the soil downwardly. The relative movement between the windings ensures the wheel does not become clogged with trash in dry conditions or trash and mud in wet conditions.

In the interest of keeping manufacture of the wheel simple and economical, the coil in the preferred embodiments is a continuous coil. However, it is reasonably foreseeable that the inventive concept of the cultivating wheel could be embodied in a discontinuous coil. For example, the coil could be broken so as to have separate windings or be interrupted with connecting members between the windings, provided some relative movement between the windings is still achievable.

It is understood that other materials aside from spring steel, such as mild steel, rigid plastics or other coil constructions, may be used to form the coil 16 provided some relative movement between the coil windings is achievable. Although annular-shaped windings are the most ideal, the present wheel would operate satisfactorily with other shapes, for instance, with octagon or decagon-shaped windings.

It is also foreseeable that to maintain the structural integrity of the coil windings, the wheel may include spokes extending from a central hub, such as the stub axle assembly 44, to the inner circumference of the windings. This would prevent distortion of the annular cultivating wheel without inhibiting the relative sideways movement of the windings.

Embodiments of the present cultivating wheel may differ in the number of main windings depending on the purpose of the wheel and the desired effect. For example, a cultivating wheel with only two main coils forms a narrower and deeper press into the soil. As a general rule, the fewer number of coils the deeper the wheel is able to push into the soil. A deeper press is particularly suitable in wet soil conditions. Consequently, a wheel with a larger number of windings is more suited to dry soil. It is envisaged that in most applications two to six coil windings will be sufficient.

In muddy conditions mud collects on the windings of the coil. In all embodiments, the coil windings are freely responsive to the ground travelled over and therefore the coil has a tendency to compress and expand, and to bounce up and down. This movement flicks mud and soil on the windings off the helical coil 16. Soil and trash that would normally accumulate in large clumps on a traditional press wheel is flicked off as a result of the constant separation of the windings as they leave the furrow. The damping feature of some embodiments described ensure the vibrations and jolts caused by the relative movement of the windings and the vertical movement of the press wheel running over uneven ground does not damage the coil 16 and overall provides for a more controlled run.

Pivot joints 48 and 49 allow the agricultural wheel to be mounted on an angle for levelling ground. The flexible relative movement of the windings moves the mud inside the helical coil 16 so that mud passes out of the windings and through the end of the coil adjacent the terminal winding 26 as the wheel simultaneously drags and revolves over the ground. The build up of mud and trash is avoided by the constantly moving windings and the continuous squeezing of the coils.

The agricultural wheel 10, 40, 80 can be mounted at an angle relative to the direction of travel. The angle of pivot/inclination of the wheels can vary between 0° and 70° and normally between 30° and 40°. As angled press wheels 0 are pulled by the machine they rotate around the axis of the stub axle and are simultaneously dragged in the direction of travel. While press harrows 10 are clamped tightly to the shaft, the shaft rotates and the press harrows are simultaneously dragged across the ground. Rather than running deep in a straight line as in the furrow pressing operation, the angled wheels run shallow covering more ground and thereby flattening clods and generally levelling the ground. The bite on the press wheels is less deep when they are at an angle than with straight in-line rotation.

As a press harrow, the coil windings in the levelling operation oscillate relative to one another thereby preventing the build up of mud, straw and the like on the wheels. The coil wheels are therefore able to function cleanly and effectively in levelling the ground for long periods and without need for maintenance.

The agricultural wheel of the present invention is able to run clean without mud or trash blockages whilst pressing furrows or levelling fields owing to the flexing motion of the coil. With regular press wheels or levelling harrows, the build up of trash and mud creates blockages on the wheel which consequently transfer to blockages and clumps in the field. Crop yields fare better in evenly tilled fields and firmly pressed furrows. The present cultivating wheel dramatically reduces the trash and mud build up on the wheels. The resulting evenly level field provides a good base for smoothly planting seeds. As a pressing device the agricultural wheel packs the soil into the ground, breaks clogs and leaves a layer of tilth above the grain. This has been found to yield better and earlier crops owing to the better soil to grain contact in the pressed furrow.

The life of the press wheel additionally is extended because the design reduces the concentration of stresses likely to cause fractures, points of weakness and damage. Both as a press wheel and a substitute for the conventional levelling harrow, the present wheel lends itself to be a very useful, simple and relatively inexpensive agricultural implement.

For the purpose of this specification the words "comprising", "comprise" or "comprises" are understood to mean the inclusion of a feature but not exclusion of any other feature.

The invention claimed is:

1. A ground driven agricultural wheel in the form of a press wheel or press harrow, comprising
a helical spring coil having
a first end located at a first end of the coil,
a second end located at a second end of the coil,
the first end being a different end to the second end, and windings extending between the first end and the second end to form the spring coil, the windings of the coil being flexible so as to be relatively movable with respect to one another in response to flexing movement of the coil, the first end and the second end being mounted to a hub assembly, wherein the first end is mounted to the hub assembly by an articulated link, the articulated link providing relative movement between the first end and the hub assembly to vary the relative distance between the hub assembly and the first end.

2. The agricultural wheel of claim 1, wherein the articulated link comprises a hinge.

3. The agricultural wheel of claim 1, wherein the articulated link comprises two hinges.

4. The agricultural wheel of claim 3, wherein the two hinges have parallel axes of rotation.

5. The agricultural wheel of claim 1, wherein the first end corresponds to a leading end of the coil and the second end corresponds to a trailing end of the coil.

6. The agricultural wheel of claim 1, wherein the first and second ends are mounted to separate hub assemblies.

7. The agricultural wheel of claim 1, wherein the second end is fixedly mounted to the hub assembly.

8. The agricultural wheel of claim 1, wherein the hub assembly is mounted to a shaft or stub axle via a torsion damping mechanism.

9. The agricultural wheel of claim 8, wherein the hub assembly includes two connecting parts and the torsion damping mechanism is a resilient torsion dampener wherein the resilient torsion dampener is located between the two connecting parts in the hub assembly that connects the coil windings to the shaft or stub axle.

10. The agricultural wheel of claim 1, wherein the hub assembly includes a shaft attachment adapted to be mounted to a shaft or stub axle.

11. The agricultural wheel of claim 9, wherein the resilient torsion dampener is an insert located within a recess provided in a shaft attachment wherein the resilient torsion dampener and insert are shaped to resist rotation of the resilient torsion dampener with respect to the shaft attachment.

12. The agricultural wheel of claim 11, in which the resilient torsion dampener and recess are substantially square in cross-section.

13. The agricultural wheel of claim 1, further comprising a coil dampener located within a coil mount wherein the coil dampener is located between the first end and the hub assembly in the coil mount and the first end is clamped between coil mount plates located in the hub assembly.

14. The agricultural wheel of claim 13 in which the coil dampener is located between the coil mount plates.

15. The agricultural wheel of claim 7 in which the second end fixedly mounted to the hub assembly has a radius which is smaller than the radius of the helical coil to create a tighter curve at or towards the second end.

16. The agricultural wheel of claim 10, wherein the torsion dampener mechanism indirectly connects the coil windings to the shaft or stub axle.

17. The agricultural wheel of claim 1, in which the hub assembly further comprises a keyed rod extending from a coil mount in which the keyed rod is inserted into a torsion dampener mechanism which is housed in a shaft attachment wherein the keyed rod is oriented parallel to an axis of rotation of the shaft or stub axle.

18. The agricultural wheel of claim 3, in which one of the hinges is located at a first hub assembly and the other of the hinges is located at a first clamp mount which includes two clamp halves wherein the first end of the coil is located intermediate the two clamp halves to mount the coil to the first hub assembly.

19. The agricultural wheel of claim 12, in which the resilient torsion dampener includes a through hole for receiving a keyed rod therein in which the through hole is substantially square shaped in cross-section wherein the square cross section of the through hole is 45° out of phase to the square cross section of the resilient torsion dampener.

20. The agricultural wheel of claim 4, further comprising a linking member linking the two hinges wherein the linking member is a bar linkage interconnecting the two hinges and the two hinges are each a pivoting hinge in which each hinge rotates about respective pivot axis in which the pivot axes are the parallel axes of rotation.

* * * * *